(12) United States Patent
Pilossof et al.

(10) Patent No.: US 6,351,296 B1
(45) Date of Patent: Feb. 26, 2002

(54) LIQUID CRYSTAL BEAM POLARIZER AND METHOD FOR MANUFACTURING THEREOF

(75) Inventors: Nissim Pilossof, Rehovot; Klara Vinokur, Ashdod; Isaac Shariv, Ramat Hasharon, all of (IL)

(73) Assignee: Fabia Engineering (1992) Ltd., Yavne (IL)

( * ) Notice: Subject to any disclaimer, the term of this patent is extended or adjusted under 35 U.S.C. 154(b) by 0 days.

(21) Appl. No.: 09/014,355

(22) Filed: Jan. 27, 1998

(51) Int. Cl.[7] .................. G02F 1/1335; G02F 1/1333
(52) U.S. Cl. ................... 349/57; 349/158; 349/160
(58) Field of Search ........................... 349/57, 158, 160

(56) References Cited

U.S. PATENT DOCUMENTS

| | | | |
|---|---|---|---|
| 4,768,864 A | * | 9/1988 | Wu et al. ............... 349/57 |
| 4,882,235 A | * | 11/1989 | Resler ................. 349/202 |
| 5,235,444 A | | 8/1993 | De Vaan |

OTHER PUBLICATIONS

A.A. Karetnikov, Polarization prism employing an oriented layer of a nematic liquid crystal, The Optical Society of America 1990, p. 445–447, Sov. J. Opt. Technol. 56(7), Jul. 1989.

A Kashnow and C.R. Stein, Total–Reflection Liquid–Crystal Electrooptic Device, pp. 2309–2311, Oct. 1973, vol. 12. No. 10, Applied Optics.

A.A. Karetnikov, Using the interface between glass and a nematic liquid crystal for optical–radiation polarization over a broad spectral range, The Optical Society of America, 1990, p. 187–188, Opt. Spectrosc. (USSR) 67 (2), Aug. 1989.

* cited by examiner

*Primary Examiner*—William L. Sikes
*Assistant Examiner*—Tarifur R. Chowdhury
(74) *Attorney, Agent, or Firm*—Rosenman & Colin LLP (57) ABSTRACT

A beam polarizer device for splitting an unpolarized beam of incident radiation into first and second beams of different polarizations. The beam polarizer comprises a birefringent cell interposed between a pair of parallel sides of first and second prisms made of an optically transparent material. The birefringent cell is formed of an oriented organic material having a desired orientation of its optical axis relative to the sides of the prisms enclosing the birefringent cell therebetween. The organic material has substantially different refraction indices $n_1$ and $n_2$ for light components of, respectively, two different orientations of electric fields relative to the direction of propagation of a beam impinging onto the birefringent cell while propagating inside the first prism. The optically transparent material has a refraction index $n_3$ which is substantially equal to the greatest one between the refraction indices $n_1$ and $n_2$.

17 Claims, 8 Drawing Sheets

LIQUID CRYSTAL BEAM POLARIZER AND METHOD FOR MANUFACTURING THEREOF

FIELD OF THE INVENTION

The present invention is in the field of polarization sensitive beam splitting techniques and relates to a beam polarizer device based on the effect of double refraction of light.

BACKGROUND OF THE INVENTION

Beam polarizers are well known optical devices that are widely used as filters for allowing the passage of light polarized in one direction only, or for image separation. Beam polarizer devices of the kind specified above, employing the effect of double refraction of light, are used in applications which need two spatially separated light components of the different polarizations to be produced from an unpolarized light beam. Such a device typically comprises two spaced-apart glass wedges and a polarization sensitive media therebetween. The term "different polarizations" signifies different orientations of the electric fields of a light wave, which are mutually perpendicular, each being perpendicular to the direction of propagation of an unpolarized beam impinging onto a polarization sensitive media.

The polarization sensitive media is typically in the form of either a plane-parallel, solid-state, birefringent plate, or a multi-layered dielectric structure. The production of the plate-like birefringent media requires the use of natural crystals of high optical quality such as, for example, calcite. Unfortunately, the natural crystals of large sizes cannot be easily obtained. The use of a multi-layered structure provides high polarization purity in one of the channels, unless a very complicated structure up to forty layers is employed. However, even employing such a complicated multi-layered structure, the beam polarizer suffers from a drawback consisting in an unavoidable requirement of a substantially small 'acceptance angle', i.e. the angle of incidence of a beam of radiation to be split onto a beam polarizer device. This is caused by the fact that the operation of the multi-layered structure (which is typically formed of different dielectric materials) is based on an interference phenomenon which allows for an acceptance angle not exceeding 3°.

Figure 1:
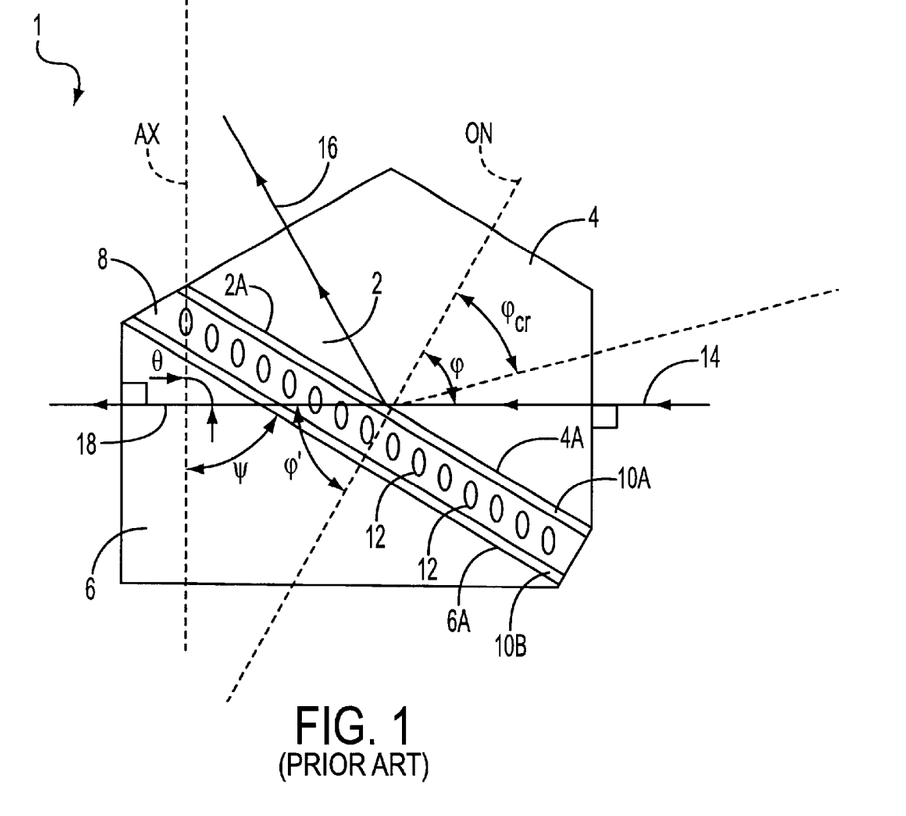
FIG. 1 illustrates a conventional beam polarizer device employing an LC cell as a birefringent medium.

Beam polarizer devices employing a liquid crystal (LC) cell as a birefringent medium have been developed and disclosed, for example, in the article "Using the Interface Between Glass and a Nematic Liquid Crystal for Optical-Radiation Polarization Over a Broad Spectral Range", A. A. Karetnikov, Opt. Spectrosk. (USSR), 67, 324–326, August 1989. Such a device is schematically illustrated in FIG. 1 being generally designated 1. The device 1 comprises a conventional LC cell 2 located between parallel sides 4$a$ and 6$a$ of a pair of glass prisms 4 and 6. The LC cell 2 typically comprises a layer 8 formed of a nematic liquid crystal material (NLC), which is enclosed between two so-called 'orienting layers' 10$a$ and 10$b$ formed on the sides 4$a$ and 6$a$. The orienting layers 10$a$ and 10$b$, which are in the form of thin polymer films, provide a homogeneous orientation of the long axes, generally at AX, of rod-like molecules 12 of the NLC, defining thereby the orientation of an optical axis of the layer 8. The molecules 12 are oriented at a certain so-called "pre-tilt angle" $\Psi(0°<\Psi<90°)$ relative to the surface 2$a$ of the LC cell 2.

The device 1 operates in the following manner. An unpolarized light wave 14 impinges from the glass 4 onto the surface 2$a$ at an angle $\phi$. The surface 2$a$ of the LC cell represents an interface on which two different light components contained in the unpolarized wave 14 are spatially separated into so-called "ordinary" and "extraordinary" beams 16 and 18, respectively.

The terms "ordinary beam" and "extraordinary beam" used herewith signify the beams of different polarizations produced by the passage of an unpolarized light beam through a crystal. The "ordinary beam" is that which obeys Snell's Law and gives a constant refraction index for all angles of incidence, while the "extraordinary beam" is that which does not obey Snell\s Law. The different polarizations are defined by different orientations of the electric fields of a light wave relative to a plane of polarization. The plane of polarization, generally designated 20, is such a plane that contains beams impinging onto and reflected from the birefringent cell, i.e. beams 14 and 16, and a normal ON to the cell's surface.

Thus, the beam 16 contains a light component having one of the two orientations of the electric field, i.e. one polarization, while the beam 18 contains a light component of the other orientation of the electric field, i.e. the other polarization. As indicated above, these different orientations of the electric field are mutually perpendicular, each being perpendicular to the direction of propagation of the beam 14 impinging onto the LC cell's surface 2$a$.

The beam 18 propagates inside the prism 6 defining an angle $\theta$ between the direction of its propagation and the optical axis AX of the NLC layer 8. The NLC layer 8, similar to uniaxial crystal plate, is characterized by refraction indices $n_{or}$ and $n_{ex}$ for ordinary and extraordinary beams 16 and 18, respectively. It is known that the refraction index $n_{ex}$ represents a function of the angle $\theta$ and is associated with the refraction index $n_{or}$, as follows:

$$n_{ex}(\theta) = N_{pr} \cdot N_{ex}(n_{or}^2 \sin^2\theta + N_{ex}^2 \cos^2\theta)^{-\frac{1}{2}}$$

wherein $N_{pr}$ is the refraction index of the glass prisms; $N_{ex}$ is the fundamental value of the refraction index for an extraordinary beam, that is:

$$N_{ex} = n_{ex}(90°)$$

The refraction index $N_{pr}$ is chosen to be as follows:

$$N_{pr} \approx N_{ex}$$

$$N_{pr} \approx n_{ex}(\theta)$$

If the angle of incidence $\phi$ satisfies the following condition:

$$\phi > \phi_{cr}$$

wherein $\phi_{cr}$ is a critical angle defined by Snell's Law, then the ordinary beam 16 undergoes a total internal reflection (TIR), while the extraordinary beam 18 propagates inside the LC cell 2 with a divergence angle $\phi$. The angle of orientation $\theta$ of the direction of propagation of the beam 18 relative to the optical axis AX is associated with the divergence angle $\phi'$ and with the angle of orientation $\psi$ of the optical axes AX relative to the surface 2$a$ as follows:

$$\theta = 90° + \phi' - \psi$$

It is thus understood that the existence of the pre-tilt angle $\psi$ significantly influences the above conditions related to the refraction index $n_{ex}$. Obviously, if a beam polarizer is a so-called "active device", a certain desired value of a pre-tilt angle can be obtained by means of an electric field appropriately applied across the LC layer. However, the case may be such that a beam polarizer is a so-called "passive device" and, therefore, such an application of the electric field is either undesirable or ineffective.

It is often the case that a beam polarizer device is the constructional part of a complicated polarization sensitive optical system such as, for example, projection display. This requires the maximum purity of two different polarizations, the preset orientations thereof relative to the plane of polarization and a substantially wide range of the acceptance angle.

SUMMARY OF THE INVENTION

It is an object of the present invention to provide a novel beam polarizer device and a method for its manufacturing for splitting an unpolarized radiation into a pair of spatially separated radiation components of different polarizations.

It is a further object of the present invention to provide such a beam polarizer device in which the different polarizations are substantially fully separated from each other.

There is thus provided, according to the present invention, a beam polarizer device for splitting an unpolarized beam of incident radiation into first and second beams of different polarizations, said beam polarizer comprising:

a birefringent cell interposed between a pair of parallel sides of first and second prisms made of an optically transparent material;

wherein the birefringent cell is formed of an oriented organic material having a desired orientation of its optical axis relative to said sides of the prisms;

wherein the organic material has substantially different refraction indices $n_1$ and $n_2$ for light components of, respectively, two different orientations of electric fields relative to the direction of propagation of a beam impinging onto the birefringent cell while propagating inside the first prism;

wherein said optically transparent material has a refraction index $n_3$ which is substantially equal to the greatest one between the refraction indices $n_1$ and $n_2$.

Thus, the idea of the present invention is based on the following main features. The organic material is formed of elongated molecules having their long axes. The term "oriented organic material" used herewith, signifies that the elongated molecules have a homogeneous orientation of the long axes, defining thereby an orientation of the optical axis of the birefringent cell.

The organic material may be in the form of a stretched polymer film such as, for example, polycarbonate or mylar. To this end, the film is stretched in a manner to provide the desired orientation of its optical axis. Preferably, the optical axis of the film is either perpendicular or parallel to the sides of the prism enclosing the film therebetween.

Alternatively, the organic material may be a liquid crystal (LC). In this case, the birefringent cell is in the form of a conventional LC cell comprising an LC layer interposed between a pair of oriented layers formed on the parallel sides of the first and second prisms enclosing the LC cell. The optical axis of the LC cell is oriented at a desired angle $\psi$ relative to the parallel sides of the prisms enclosing the LC cell. To this end, both the LC and orienting materials are selected so as to provide the desired value of the angle $\psi$. Additionally, the orienting layer may be specifically processed so as to adjust the value of the angle $\psi$. Preferably, each of said orienting layers has a thickness less than $\lambda/4$ wherein $\lambda$ is the shortest wavelength in a wavelength range of the incident radiation.

The first and second prisms may be symmetrically identical. Each of the prisms may be in the form of a Dove prism.

Preferably, the device also comprises an additional birefringent cell formed on an outer surface of that side of the first prism which is parallel to the sides enclosing the birefringent cell. The additional birefringent cell is constructed similar to the birefringent cell enclosed between the parallel sides of the first and second prisms. More specifically, the additional birefringent cell is formed of organic and optically transparent materials, having the similar relationship between their refraction indices as the birefringent cell enclosed between the first and second prisms. An absorbing plate may cover the additional cell at its outer side.

Preferably, the device also comprises a pair of diffraction gratings of a predetermined design, located at opposite sides of the birefringent cell.

Preferably, at least one of those ribs of the device which define the parallel sides of the first and second prisms is in the form of an elongated pit having beveling edges. This at least one pit is filled with gluing and sealing materials.

According to another aspect of the present invention, there is provided a method for manufacturing a beam polarizer device for splitting an unpolarized beam of incident radiation into first and second beams of different polarizations, said beam polarizer comprising a birefringent cell interposed between a pair of parallel sides of first and second prisms made of an optically transparent material, the method comprising the steps of:

(a) selecting an organic birefringent material having elongated molecules and substantially different refraction indices n1 and $n_2$ for light components of, respectively, two different orientations of electric fields contained in a light wave relative to the direction of its propagation while impinging onto the birefringent cell;

(b) orienting the elongated molecules of the selected organic material so as to provide a desired orientation of its optical axis relative to said sides of the prisms;

(c) selecting the optically transparent material having a refraction index $n_3$ which is substantially equal to the greatest one between the refraction indices $n_1$ and $n_2$.

Thus, the beam polarizer device constructed according to the invention, namely by selecting the materials of the device so as to provide the desired relationship between their refraction indices and by obtaining a desired orientation of the optical axis of a birefringent cell, is capable of providing substantially pure separation of the different polarizations within a substantially wide range of an acceptance angle (about ±10°).

BRIEF DESCRIPTION OF THE DRAWINGS

In order to understand the invention and to see how the same may be carried out in practice, several preferred embodiments will now be described, by way of non-limiting example only, with reference to the accompanying drawings, in which.

DETAILED DESCRIPTION OF PREFERRED EMBODIMENTS

FIG. 1 illustrates a conventional beam polarizer device employing an LC cell as a birefringent medium. The LC cell is typically characterized by the existence of a pre-tilt angle between the long axes of the LC molecules and the surface of the LC cell. The pre-tilt angle influences the refraction index of an extraordinary beam and is conventionally adjusted by means of an electric filed appropriately applied across the LC cell.

Figure 2A:
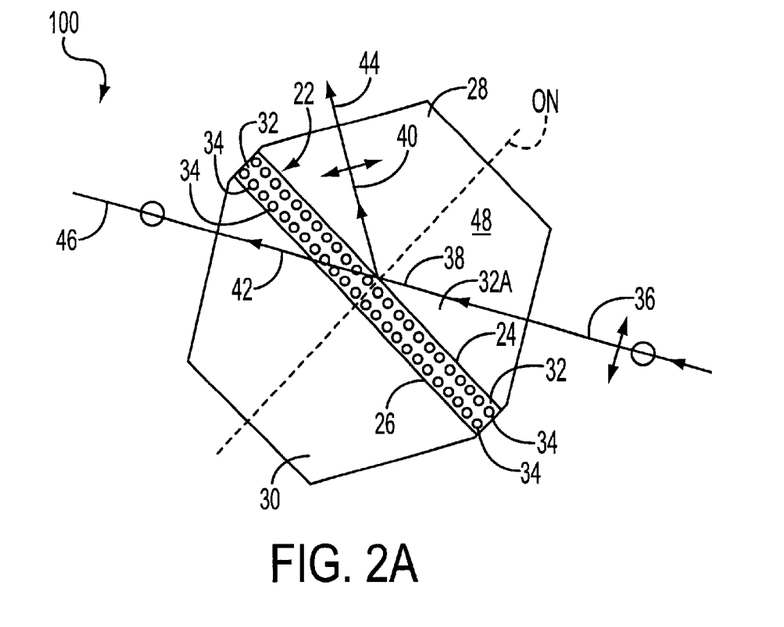
FIGS. 2a and 2b are illustrations of two beam polarizer devices constructed in accordance with two embodiments of the invention, which devices have different orientations of optical axes of their birefringent cells.
Figure 2B:
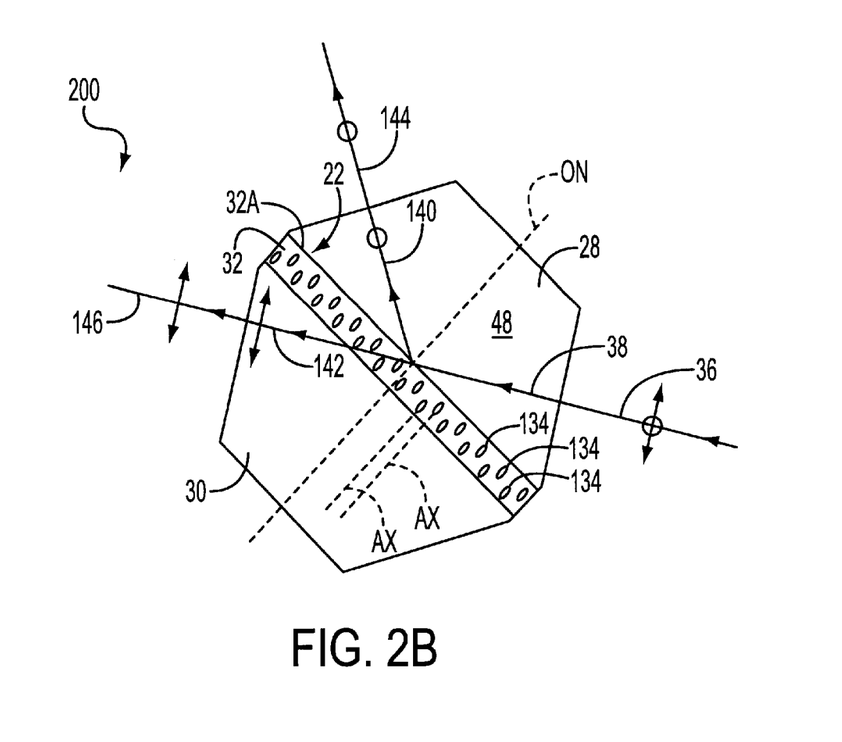

Referring to FIGS. 2a and 2b, two alternative examples of beam polarizer devices are illustrated, generally designated 100 and 200, which are constructed according to the invention. The same reference numbers identifies components that are identical in the devices 100 and 200, in order to facilitate understanding The beam polarizer 100 comprises a birefringent cell 22 enclosed between parallel sides 24 and 26 of a pair of prisms 28 and 30, respectively. The birefringent cell 22 is formed of an oriented organic material 32, for example, in the form of a polymer film. The prisms 28 and 30 are made of an optically transparent material, for example, glass. The organic material 32 is formed of elongated molecules, generally at 34, having a certain desired homogeneous orientation of their long axes, for example, parallel to the sides 24 and 26. The orientation of longs axes of the molecules 34 constitutes the orientation of an optical axis of the film 32, which is not shown in FIG. 2a owing to this specific orientation of the molecules, i.e. perpendicular to the plane of the figure.

An unpolarized light beam 36 of an incident radiation impinges onto the prism 28 resulting in a refracted beam 38 which, while propagating inside the prism 28 falls onto a surface 32a of the film 32. The surface 32a constitutes an interface between the glass prism 28 and the birefringent cell 22. The interface 32a totally reflects a light component of one polarization, contained in the beam 38, while allowing a light component having the other polarization for propagating through the film 32. This results in the provision of two spatially separated beams 40 and 42 formed of, respectively, the reflected and propagated light components. The beams 40 and 42 further propagate inside the prisms 28 and 30 and ensue therefrom in accordance with Snell's law, producing two output beams 44 and 46.

Beams diagram at the interface 32a defines a plane of polarization 48 which typically contains the beam 38 impinging onto the film 32, the reflected beam 40 and a normal ON to the surface 32a. It is understood, although not specifically shown in FIG. 2a, that the optical axis of the film 32 is perpendicular to the plane of polarization 48. Hence, p-polarized light component of the beam 38 undergoes total internal reflection at the interface 32a and s-polarized light component propagates through the film 32. The beams 40 and 42, and, therefore, the output beams 44 and 46 are formed of light components of p- and s- polarizations, respectively.

According to the example of FIG. 2b, a polymer film 32 of the device 200 is stretched in a manner to provide another desired orientation of the long axes of molecules 134 relative to the interface 32a and, thereby, of an optical axis OX of the film 32. In distinction to the device 100, the optical axis OX lies in the plane of polarization 48. As a result of the interaction between the unpolarized beam 38, propagating inside the prism 28, and the film 32 two spatially separated output beams 144 and 146 formed of light components of s- and p-polarizations, respectively, are produced.

In both examples described above, owing to the fact the optical axes of the birefringent cells are oriented, respectively, parallel and perpendicular relative to the interface 32a, the directions of the p-and s-polarizations are also precisely parallel and perpendicular to the plane of polarization 48.

Figure 3:
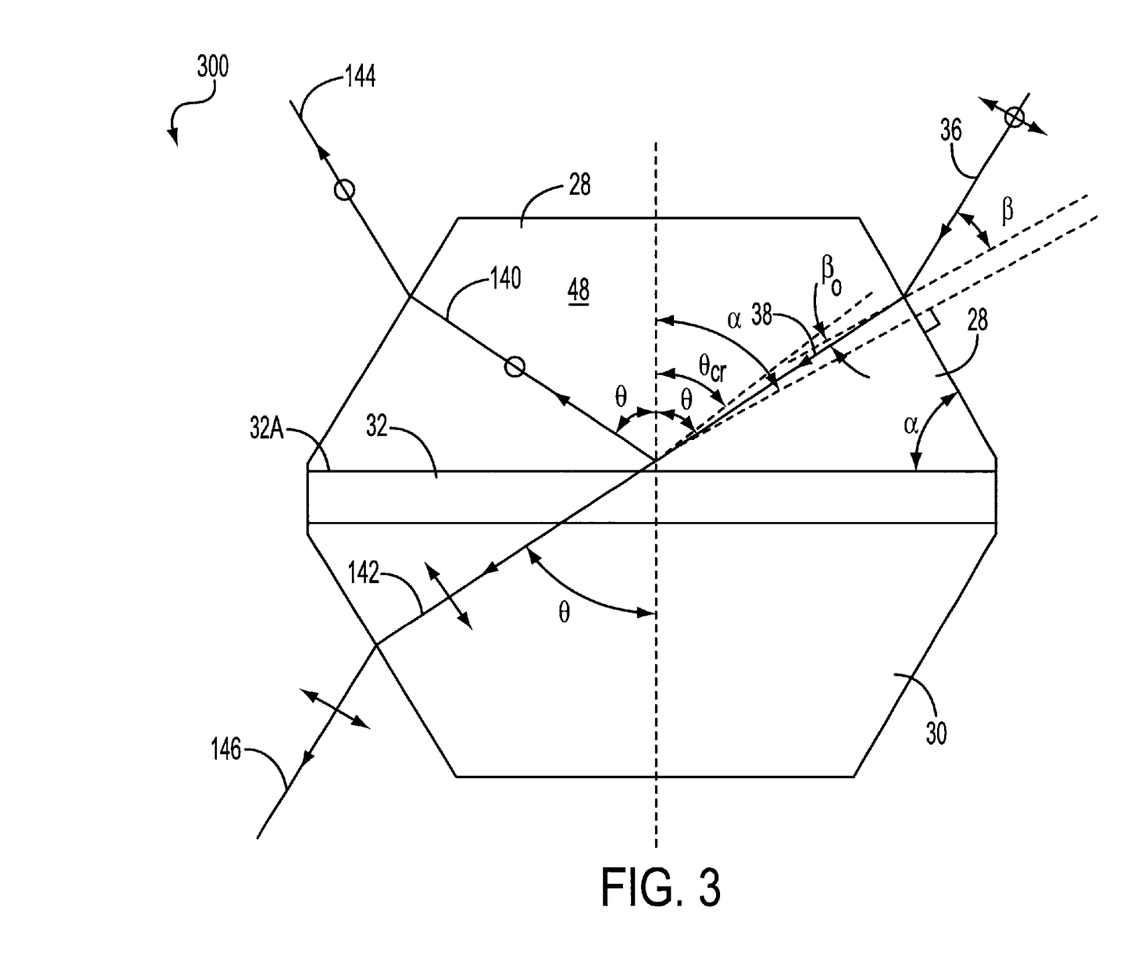
FIG. 3 is a schematic view of the device of either kind of FIG. 2a or 2b, more specifically illustrating the main principles of the invention.

Turning now to FIG. 3, there is more specifically illustrated the main principles of a method according to the invention for designing a beam polarizer device, generally designated 300, of the kind specified, for example, that of FIG. 2b. Similarly, the same reference numbers identify those components, which are identical in the devices 200 and 300. The beam polarizer 300 comprises a pair of optically transparent prisms 28 and 30, which are, for example, symmetrically identical, and the stretched polymer film 32 enclosed therebetween. The polymer film 32 has refraction indices $n_1$ and $n_2$ for light components of the different polarizations, respectively. The prism 28 has its acute angle $\alpha$ and is made of an optically transparent material with a refraction index $N_{pr}$.

An unpolarized beam 36 impinges in air onto the prism 28 at an angle of incidence or a so-called 'acceptance angle' $\beta$ and a resulted refracted beam 38 propagates inside the prism 28 with a divergence angle $\beta_0$ which is defined by Snell's Law as follows:

$$\sin\beta_0 = \frac{\sin\beta}{N_{pr}}$$

As shown, the beam 38 impinges onto the interface 32a at an angle of incidence $\theta$. It is appreciated that the angle $\theta$ satisfies the above condition of the total internal reflection and one light component contained in the unpolarized beam 38, for example, that corresponding to the refraction index $n_1$, is totally reflected from the interface 32a. The critical angle $\theta_{cr}$ is defined as follows:

$$\sin(\theta_{cr}) = \frac{n_1}{N_{pr}}$$

Thus, the angle $\theta$, on the one hand, depends on both the acceptance angle $\beta$ and the refraction index $N_{pr}$ and, on the other hand, is given as follows:

$$\theta = \alpha - \beta_0$$

One of the essential feature of the present invention is that, according to the experimental results, the acute angle $\alpha$ of the prism 28 usually varies between 66° and 70° while the acceptance angle $\beta$ is of about ±10°. More specifically, calculations of the prism acute angle $\alpha$ were performed in a beam polarizer device of the kind illustrated in FIG. 3, wherein the birefringent cell was formed of a stretched policarbonate film and the prisms were made of Scott heavy glass SF3. The relevant refraction indices are given as follows:

$n_1=1,57$ $n_2=1,74$ $N_{pr}=1,74$

It is evident that feasible and the most convenient geometry of a beam polarizer device can be obtained within a substantially wide range on acceptance angles by means of employing a birefringent cell in the form of an oriented organic material.

As known, the birefringence of a double refracting medium is defined by the difference between the refraction indices $n_1$ and $n_2$ for light components of the different polarizations. It is therefore appreciated that, in order to provide the maximum purity of spatially separated different polarizations, the oriented organic material 32 should be selected so as to have significantly different values of the indices $n_1$ and $n_2$, for example:

$n_2 > n_1$

Another essential feature of the present invention is the provision of the prisms 28 and 30 made of such an optically transparent material whose refraction index $N_{pr}$ satisfies the following condition:

$N_{pr} \approx n_2$

Figure 4:
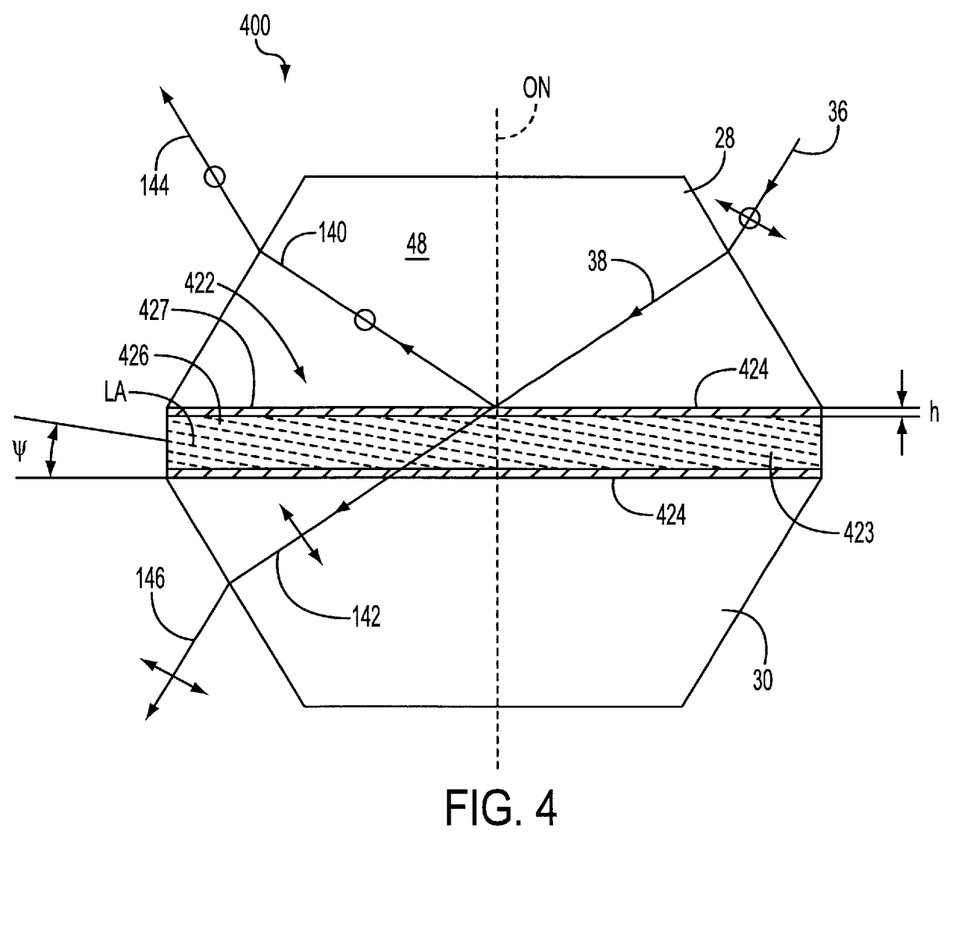
FIG. 4 is a schematic view of a beam polarizer device according to another embodiment of the invention employing another type of the birefringent cell.

Reference is made to FIG. 4, illustrating a beam polarizer device 400 of the kind specified which, in distinction to the previously described embodiments, employs a conventional LC cell 422 as a birefringent medium. There is illustrated, using the same reference numbers for identifying those components which are identical in the above devices and the device 400, that the LC cell 422, enclosed between the prisms 28 and 30, typically comprises an LC layer 423 bounded by two layers 424 formed of an orienting material having a thickness h. It is important to note that, in order not to affect the beam polarizer performance, the thickness h of the orienting layers is substantially small, typically less than $\lambda/4$, wherein $\lambda$ is the shortest wavelength in a given wavelength range of the incidence radiation. The LC layer 423 is formed of rod-like molecules 426 having a homogeneous orientation of their long axes LA, oblique at a pre-tilt angle $\psi$ to the LC cell surface 427.

An unpolarized beam 36 impinges onto the prism 28 and, propagating thereinside refracted beam 38 falls onto the interface 427 resulting in two spatially separated output beams 140 and 142 of the different polarizations. The axis LA is oriented at an angle $\theta$ relative to the propagating beam 142. As described above with reference to FIG. 1, the pre-tilt angle $\psi$ essentially influences the above condition of the significant difference between the refraction indices $n_1$ and $n_2$ for the light components of the different polarizations. For example, if $N_2=n_2(90°)=1.70$ $n_1=1.50$ $\psi=10°$ then, for the refraction index $n_2(\theta)$, we have:

$n_2(\theta)=1.54$

It is thus evident that $n_2$ is slightly different from $n_1$ and, therefore, the condition of significant difference between them is not satisfied. In order to increase the value of the refraction index $n_2$ so as to be:

$n_2=N_2$ the pre-tilt angle $\psi$ should be increased up to 70°.

If the beam polarizer 400 is an active device, the desired value of the pre-tilt angle $\psi$ scan be obtained by appropriately applying an electric field. Unfortunately, it is often the case that this act is undesirable, or ineffective.

Figure 5A:
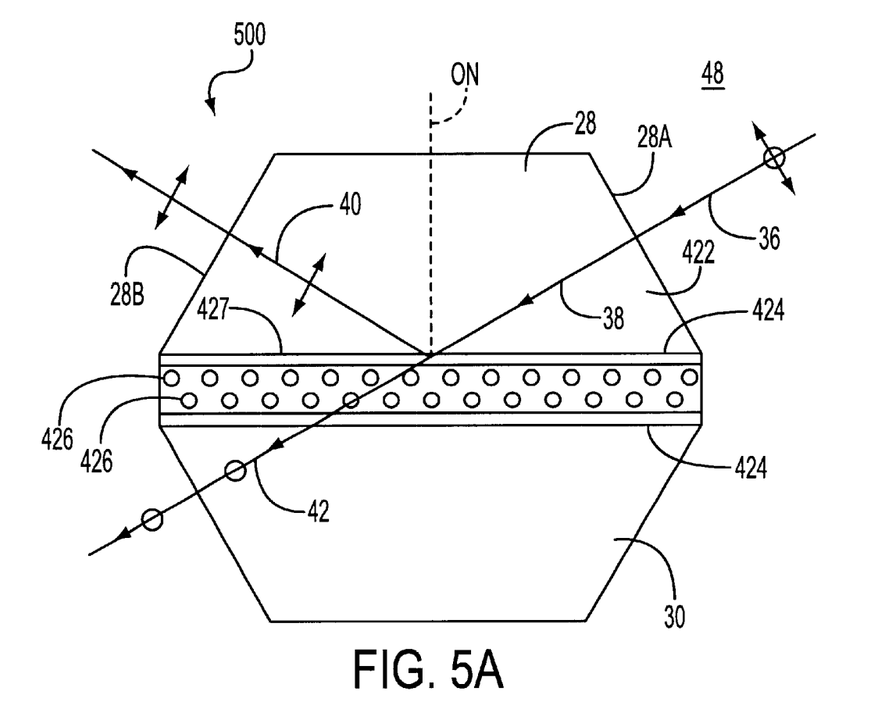
FIGS. 5a and 5b are schematic front and side views, respectively, of the beam polarizer device of the kind of FIG. 4.
Figure 5B:
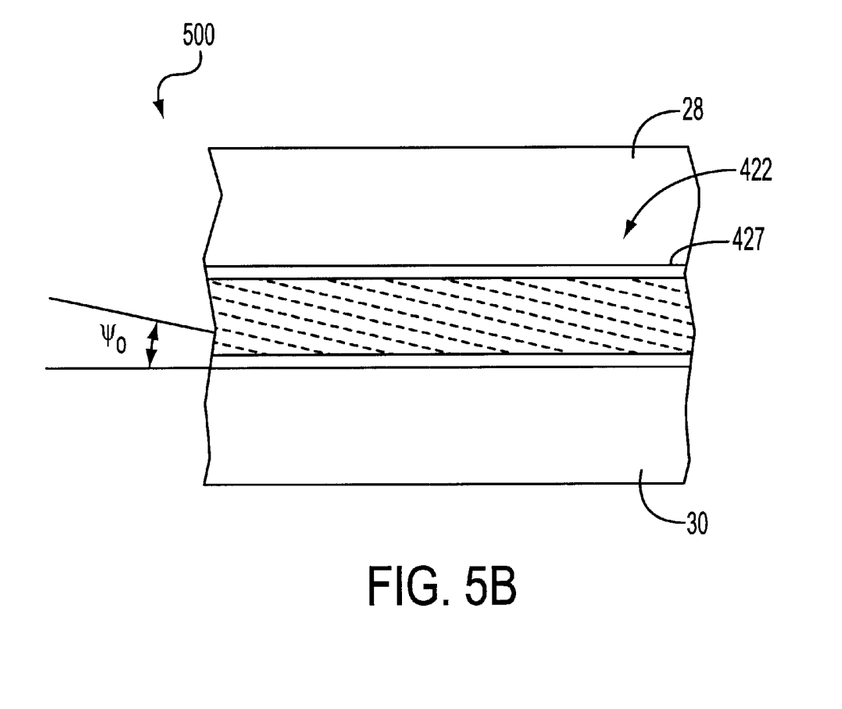

Reference is made to FIGS. 5a and 5b specifically illustrating front and side views, respectively, of a beam polarizer device, generally designated 500, of the kind shown in FIG. 4, i.e. employing an LC cell as a birefringent medium, but configured similar to that shown in FIG. 2a. Thus, the device 500 exemplifies such a passive device wherein the application of an electric field is ineffective. The same reference numbers are used for identifying the components that are identical in the devices 200, 400 and 500. Optical axes LA' of the LC molecules are located in a plane, generally at 48', perpendicular to the plane of polarization 48, and are tilted at an angle $\psi_0$ relative to the surface of the LC cell.

It is important to note that in this case the existence of any pre-tilt angle slightly influences the values of the refraction index $n_2$. However, the existence of the pre-tilt angle results in that the directions of the different polarizations are not exactly parallel and perpendicular relative to the plane of polarization 48 but are also tilted therefrom at the same angle $\psi_0$.

Yet another essential feature of the present invention is based on that a pre-tilt angle, usually existing in the case when an LC cell is used as an oriented organic material, is defined by both the LC and orienting materials. In other words, in order to obtain the desired value of the pre-tilt angle, i.e. the desired orientation of the optical axis of the LC cell, a pair of LC-orienting materials should be specifically selected. For example, according to experimental results, the use of a pair LC-Orienting materials formed of the LC material Merck E63, commercially available from Merck, England, and orienting material CU-2000, commercially available from DuPont de Nemours&Co, enables to obtain the pre-tilt angle reduced up to 0°.

Thus, for manufacturing the birefringent LC cell of a beam polarizer device, on the one hand, the LC material should be selected so as to provide a significant difference between the $n_1$ and $n_2$, and, on the other hand, the LC and orienting materials should be selected so as to provide a desired pre-tilt angle. Furthermore, the optically transparent material for the prisms should be selected so as to have its refraction index matching the greatest one between the refraction indices $n_1$ and $n_2$. It should be noted that in order to further adjust the pre-tilt angle, the orienting layers may be processed, for example, by forming them with a plurality of ordered scratches.

It is appreciated, although not specifically shown, that once the oriented organic and optically transparent materials are selected in the above described manner, the refraction index of the prisms $N_{pr}$ will match the respective (greatest) refraction index of the organic material only for a certain wavelength of the incident radiation. This means that such a beam polarizer device will provide high contrast ratio solely for the specific wavelength. In practice, when designing a complicated optical system which may include a beam polarizer device as its constructional part, a certain substantially wide wavelength range of incident radiation $\lambda_1-\lambda_2$ must be considered. To this end, in order to increase the efficiency of the beam polarizer, an average value $\lambda_{av}$ ($\lambda_{av}=(\lambda_1-\lambda_2)/2$) of the desired wavelength range is taken into account for selecting the birefringent and prisms materials.

Turning back to FIGS. 5a and 5b, it will be readily understood that the device 500 is "symmetrical" in respect of the incident radiation 36. Indeed, the relationship between the output beams 44 and 46 and the different polarizations contained therein would be the same when the unpolarized beam 36 impinges on either side 28a or 28b of the prism 28. This is a very convenient feature in general and may be important for a specific optical system.

Figure 6A:
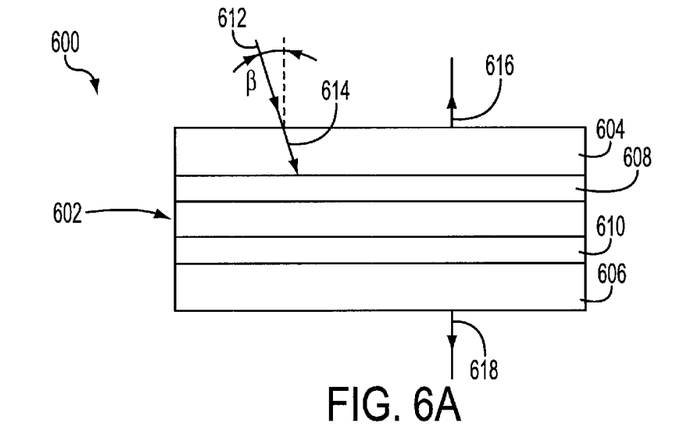
FIG. 6a is a schematic view of a beam polarizer device constructed according to yet another embodiment of the invention.
Figure 6B:
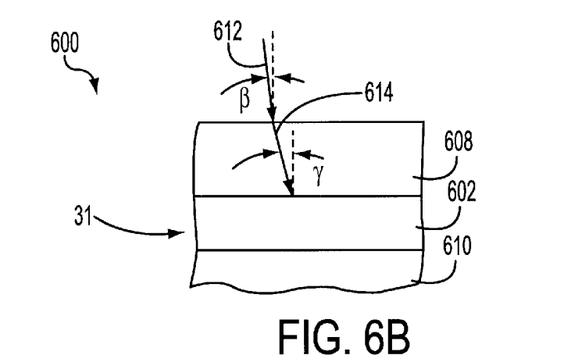
FIGS. 6b and 6c illustrate the main principles of operation of the device of FIG. 5.
Figure 6C:
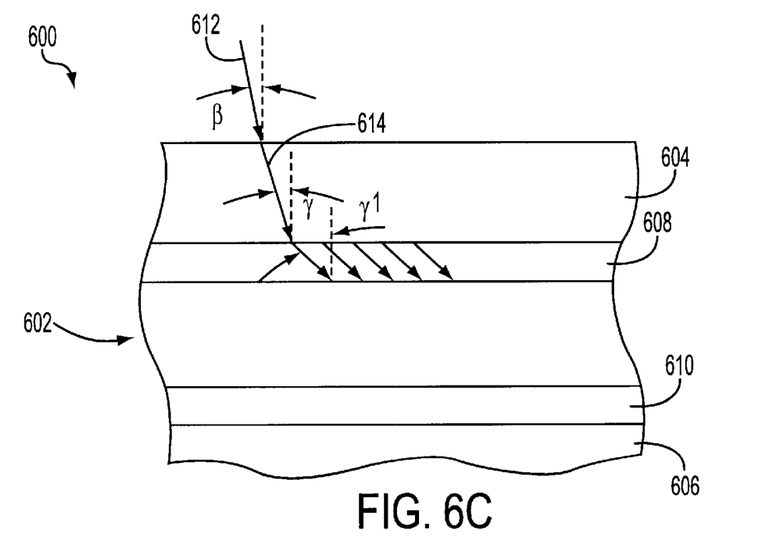

Referring to FIGS. 6a–6c, there is illustrated a beam polarizer device, generally designated 600, which is designed so as to exemplify yet another essential feature of the invention. The beam polarizer 600 comprises a birefringent cell 602 formed of an oriented organic material and located between a pair of optically transparent plates 604 and 606. A pair of diffraction gratings 608 and 610 is provided at opposite sides of the birefringent cell 602. The diffraction grating is a widely used optical device which construction and operation are well known per se and, therefore, need not be described in detail.

A beam 612 of incident radiation impinges onto the plate 604 at an acceptance angle β resulting in a refracted beam 614 which, in turn, impinges onto the cell 602 via the diffraction grating 608, producing an output beam 616 of one polarization. Light component of the other polarization passes through the cell 602 and, similarly, ensues therefrom via the diffraction grating 610 producing an output beam 618.

As illustrated in a self-explanatory manner in FIGS. 6b and 6c, in the absence of the diffraction grating 608, an angle of incidence γ of the refracted beam 614 impinging onto the cell 602, does not satisfy the required condition of total internal reflection. On the contrary, owing to the provision of the diffraction grating 608, which is appropriately designed, an angle of incidence $\gamma_1$ of the beam 614 is adjusted so as to obtain the effect of total internal reflection of a light component of one polarization. It is appreciated that the provision of the diffraction gratings enables to substantially extend the range of available acceptance angles. Additionally, such construction improves the geometry of the device and allows for easy mounting thereof within an optical system.

Figure 7:
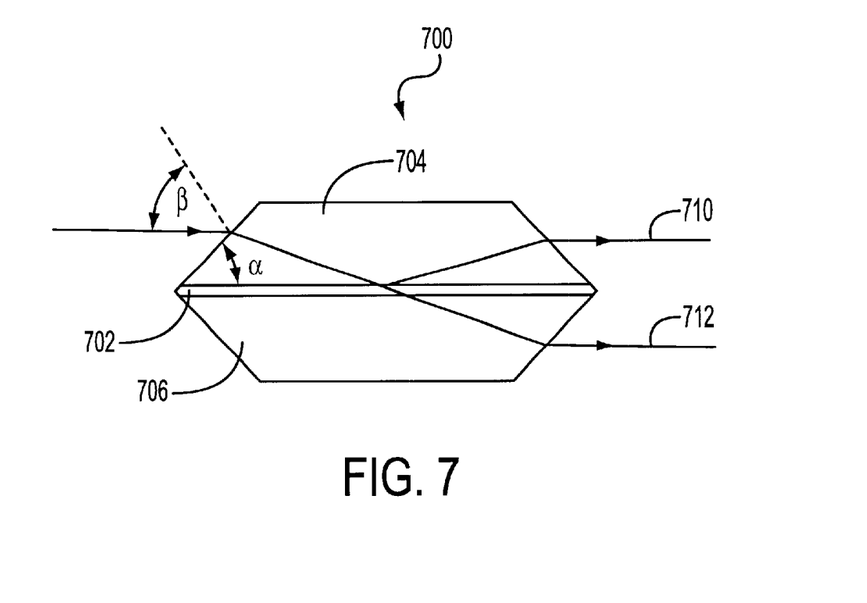
FIGS. 7 and 8 illustrate two more embodiments of the present invention.

It is often the case that output beams produced by a beam polarizer should be parallel to each other and directed in the same direction, and, preferably, in the direction of an incident radiation. To this end, a known Dove prism geometry could be employed. FIG. 7 illustrates a beam polarizer 700 comprising the birefringent cell 702 of the kind specified which is enclosed between a pair of Dove prisms 704 and 706. As known, an acute angle α of Dove prism is equal to 45° and, therefore, by directing an unpolarized beam 708 of incident radiation at an angle of incidence β being of about 45°, two parallel output beams 710 and 712 of the different polarizations are obtained.

Figure 8:
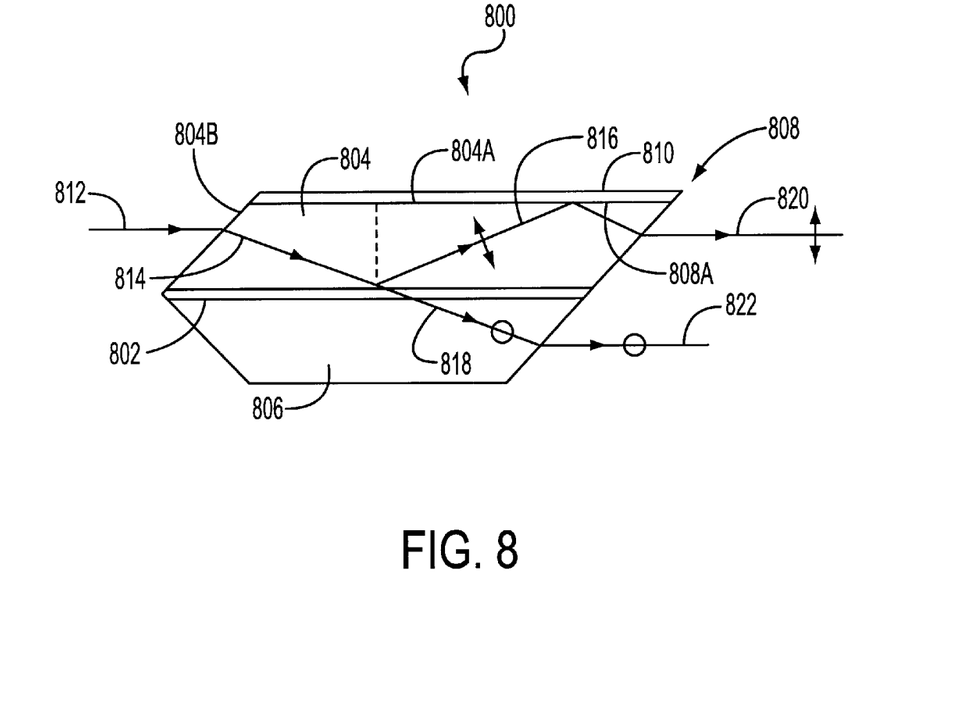

Referring now to FIG. 8, there is shown another example of a beam polarizer device 800 constructed in accordance with yet another essential feature of the present invention. The device 800 comprises a birefringent cell 802 formed of an oriented organic material and enclosed between a pair of optically transparent prisms 804 and 806 being, in distinction to the previously described embodiments, not symmetrically identical. An additional birefringent cell 808 is disposed on an outer surface 804a of the prism 804 and is covered by an absorbing plate 810. The cell 808 is similar to the cell 802 being formed of the similar oriented organic material, or, in the case of LC cell, of the similar LC and orienting materials.

As shown an unpolarized beam 812 of incident radiation impinges onto the prism 804 at its side 804b and propagates therethrough producing a refracted beam 814 which, in turn, falls onto the cell 802 resulting in totally reflected and propagating beams 816 and 818, for example of p- and s-polarizations, respectively. Owing to the provision of the additional birefringent cell 808 defining an interface 808a on which the totally reflected beam 816 undergoes a further total internal reflection, two substantially parallel output beams 820 and 822 representing completely separated different polarizations are provided.

It is appreciated that this additional cell 808 improves the efficiency of the polarizer device 800. Indeed, if the totally reflected, substantially p-polarized beam 816 occasionally contains s-polarized light component, this component will be split by the additional cell 808 due to the fact the latter functions in respect of the s-polarization similar to the cell 802. This s-polarized component, when separated, is absorbed by the plate 810.

In order to increase the service time of a beam polarizer device, on the one hand, the birefringent cell should be safety sealed and, on the other hand, the optically transparent prisms should be safety glued to each other. Unfortunately, conventional sealing such as, for example, the disposal of an optical cement or glue between the respective surfaces of prisms and a birefringent cell, cannot be successfully employed, owing to the fact the refraction index of such a gluing material would not match that of the prism along the whole surface. Moreover, the presence of such a glue between the prism's surface and the birefringent cell may change a gap between the prisms.

Figure 9A:
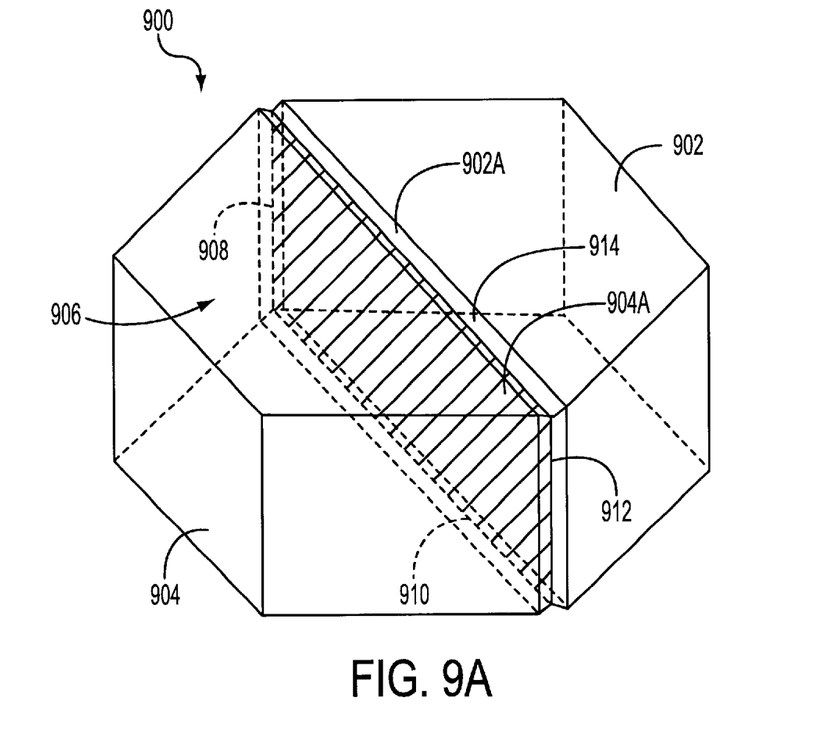
FIGS. 9a and 9b are schematic pictorial illustrations of yet another principle of the method according to the invention.
Figure 9B:
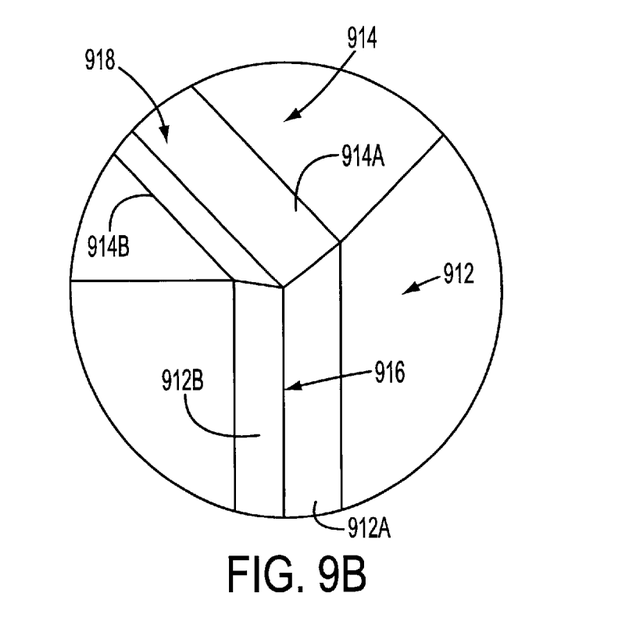

Referring to FIGS. 9a and 9b, there is illustrated yet another essential feature of the present invention consisting in the provision of a desired safety sealing of a birefringent cell and gluing of the glass prisms to each other. A beam polarizer device 900 is formed of a pair of optically transparent prisms 902 and 904 defining a pair of substantially planar, parallel sides 902a and 904a, respectively. A birefringent cell 906 formed of an oriented organic material is located between the sides 902a and 904a being attached to ribs 908, 910, 912 and 914 of the device 900. As more specifically shown in FIG. 9b, the ribs 912 and 914 are formed with beveled edges 912a–912b and 914a–914b, respectively, defining thereby elongated pits 916 and 918. It should be noted, although not specifically shown, that at least one of the two adjacent ribs may be formed like such an elongated pit. These pits 916 and 918 are filled with the glue or optical cement. The grounding of the edges increases surface areas thereof and provides better adhesion for sealing materials. In the case of an LC birefringent cell, it is filled with the selected LC material through the pit prior to gluing the latter.

Those skilled in the art will readily appreciate that various modifications and changes can be applied to the preferred embodiments of the invention as hereinbefore exemplified without departing from its scope defined in and by the appended claims.

What is claimed is:

1. A beam polarizer device for splitting an unpolarized beam of incident radiation into first and second spatially separated beams of different polarizations, said beam polarizer comprising:

a birefringent cell interposed between a pair of parallel sides of first and second prisms made of an optically transparent material;

wherein the birefringent cell is formed of an oriented organic material having a desired orientation of its optical axis relative to said sides of the prisms;

wherein the organic material has substantially different refraction indices $n_1$ and $n_2$ for light components of, respectively, two different orientations of electric fields relative to the direction of propagation of a beam impinging onto the birefringent cell while propagating inside the first prism;

wherein the optically transparent material has a refraction index $n_3$ which is substantially equal to the greatest one between the refraction indices $n_1$ and $n_2$; and wherein at least one of ribs of the device defining said parallel sides of the first and second prisms is in the form of an elongated pit having beveling edges and being filled with gluing and sealing materials.

2. The device according to claim 1, wherein the organic material is formed of elongated molecules having the desired homogeneous orientation of their long axes.

3. The device according to claim 1, wherein the first and second prisms are symmetrically identical.

4. The device according to claim 1, wherein each of the first and second prisms is a Dove prism.

5. The device according to claim 1, and also comprising an additional birefringent cell, constructed similar to said birefringent cell enclosed between the parallel sides of the first and second prisms and located on an outer surface of a side of the first prism parallel to said sides of the prisms.

6. The device according to claim 5, wherein the additional cell at its outer side is covered by an absorbing plate.

7. The device according to claim 1, and also comprising a pair of diffraction gratings of a predetermined design located at opposite sides of the birefringent cell, thereby adjusting an angle of incidence of the unpolarized beam onto the birefringent cell, and enabling to substantially extend the range of available acceptance angles.

8. The device according to claim 1, wherein the organic material is in the form of a stretched polymer film.

9. The device according to claim 8, wherein the film is stretched in a manner to provide the desired orientation of its optical axis.

10. The device according to claim 1, wherein the optical axis of the birefringent cell is perpendicular to the sides of the prisms enclosing the birefringent cell therebetween.

11. The device according to claim 1, wherein the optical axis of the birefringent cell is parallel to the sides of the prisms enclosing the birefringent cell therebetween.

12. The device according to claim 1, wherein the optical axis of the birefringent cell is parallel to a plane of polarization defined by beams diagram at an interface defined by the birefringent cell.

13. The device according to claim 1, wherein the optical axis of the birefringent cell is perpendicular to a plane of polarization defined by beams diagram at an interface defined by the birefringent cell.

14. The device according to claim 1, wherein the oriented organic material is a liquid crystal, the birefringent cell comprising an LC layer interposed between a pair of oriented layers formed on said parallel sides of the first and second prisms.

15. The device according to claim 14, wherein the optical axis of the birefringent cell is oriented at a desired angle $\psi$ relative to said parallel sides of the prisms.

16. The device according to claim 14, wherein each of said orienting layers has a thickness less than $\lambda/4$, $\lambda$ being the shortest wavelength in a wavelength range of the incident radiation.

17. A method for manufacturing a beam polarizer device for splitting an unpolarized beam of incident radiation into first and second beams of different polarizations, said beam polarizer comprising a birefringent cell interposed between a pair of parallel sides of first and second prisms made of an optically transparent material, the method comprising the steps of:

(a) selecting an organic birefringent material formed of elongated molecules and having substantially different refraction indices $n_1$ and $n_2$ for light components of, respectively, two different orientations of electric fields relative to the direction of propagation of a beam impinging onto the birefringent cell while propagating inside the first prism;

(b) orienting the elongated molecules of the selected organic material so as to provide a desired orientation of its optical axis relative to said sides of the prisms;

(c) selecting the optically transparent material having a refraction index $n_3$ which is substantially equal to the greatest one between the refraction indices $n_1$ and $n_2$; and (d) making at least one of ribs of the device defining said parallel sides of the first and second prisms in the form of an elongated pit having beveling edges, and filling the at least one pit with gluing and sealing materials.

* * * * *

UNITED STATES PATENT AND TRADEMARK OFFICE
CERTIFICATE OF CORRECTION

PATENT NO.    : 6,351,296
DATED         : February 26, 2002
INVENTOR(S)   : Nissim Philossof et al.

It is certified that error appears in the above-identified patent and that said Letters Patent is hereby corrected as shown below:

<u>Title page,</u>
Please correct the name of the first inventor to read -- Nissim Philossof. --

Signed and Sealed this

Twenty-first Day of May, 2002

Attest:

Attesting Officer

JAMES E. ROGAN
*Director of the United States Patent and Trademark Office*